United States Patent [19]

Schwarz

[11] Patent Number: 4,837,576
[45] Date of Patent: Jun. 6, 1989

[54] ANTENNA TRACKING SYSTEM

[75] Inventor: Helmut E. Schwarz, Satellite Beach, Fla.

[73] Assignee: Electrospace Systems, Inc., Richardson, Tex.

[21] Appl. No.: 672,579

[22] Filed: Nov. 16, 1984

[51] Int. Cl.$^4$ .............................................. G01S 13/66
[52] U.S. Cl. .......................................... 342/77; 342/75
[58] Field of Search ................................ 343/7 A, 7.4; 342/73–80, 352, 359, 423, 426, 427

[56] References Cited

U.S. PATENT DOCUMENTS

| | | | |
|---|---|---|---|
| 2,579,471 | 12/1951 | Buckbee et al. | 343/7.4 |
| 2,946,049 | 7/1960 | Stotz | 343/7.4 |
| 3,406,393 | 10/1968 | Kulik | 342/75 |
| 4,047,175 | 9/1977 | Taira et al. | 342/359 |

FOREIGN PATENT DOCUMENTS 57-61965   4/1982   Japan .................................. 343/7.4

OTHER PUBLICATIONS

J. DiCiurcio, "AN/TPQ-27 Precision Tracking Radar" (IEEE Intntl. Radar Conf. Proc., pp. 20–25; 4/80).

Primary Examiner—Theodore M. Blum
Assistant Examiner—Bernarr Earl Gregory
Attorney, Agent, or Firm—Richards, Harris, Medlock & Andrews

[57] ABSTRACT

An antenna tracking system tracks a primary antenna to follow a moving signal source, such as a communication satellite. A secondary antenna has a greater beam width than the primary antenna and receives the same tracking signal from the satellite. The primary antenna is tracked according to a predetermined search pattern which causes a variation in the signal amplitude depending upon the relative location of the satellite and the antenna position. The signal strength signals from the two antennas are input to a summation function which takes the difference of the two signals. The noise and signal variation component of the two signals is substantially the same and is therefore eliminated from the resulting difference signal. An antenna control unit utilizes the resulting difference signal to select the optimum signal strength for the particular step of the search pattern. This system is particularly applicable to high frequency communication channels in the higher (86 Ghz and above) frequency band which are subject to atmospheric distortion and noise.

4 Claims, 2 Drawing Sheets

ANTENNA TRACKING SYSTEM

TECHNICAL FIELD

The present invention pertains to antennas and in particular to the tracking of antennas to follow moving signal sources.

BACKGROUND OF THE INVENTION

The number of synchronous communication satellites in use is substantially increasing. Fewer communication channels are available for use with synchronous satellites because most channels are already allocated for present uses. This requires the implementation of higher frequency channels, typically the Ku band. But at these higher frequencies there are greater problems in tracking the satellites due to adverse atmospheric or noise conditions.

Synchronous communication satellites are not totally fixed in one position but instead drift about a central location point. Such satellites frequency use station keeping thrusters to direct the satellite back to its assigned position. However, there is a continuing need to track the satellites to maintain an optimum signal strength for the received signal as well as to determined the position of the satellite for sending any commands to operate the thrusters.

The high frequency communication channels, such as 8 GHz and higher, suffer from atmospheric attenuation, particularly rainfall, to a much greater extent than the lower frequency channels. There can also be other noise interference with the signal which can interfere with the tracking activity.

Conventional tracking techniques include monopulse and step track. Monopulse systems, while very effective, are too expensive for many applications. Step track systems utilize algorithms to determine satellite position by sampling signal strengths in a predetermined pattern and directing the antenna to the maximum signal strength position. In the step track system the signal amplitudes between step positions must be determined very accurately. At higher frequencies of 8 GHz and higher, the variations in the satellite signal due to noise and/or atmospheric conditions is greater than the differences in signal amplitude between the step positions. This can prevent the accurate determination of the maximum signal amplitude position.

In view of the increasing use of high frequency communication channels and the requirement to accurately track satellites using such channels, there exists a need for a method and apparatus to provide tracking control for satellite antennas which can successfully operate despite the presence of substantial random noise and signal variations on the tracking signal.

SUMMARY OF THE INVENTION

A selected embodiment of the present invention comprises a system for tracking a primary antenna to follow a signal source. The system includes a secondary antenna which has a greater beam width than the primary antenna. Circuitry is provided for producing a first signal strength signal which is received by the primary antenna from the signal source. Further circuitry is provided for producing a second strength signal which is received by the secondary antenna from the signal source. A difference signal is produced by subtracting the second signal strength signal from the first signal strength signal. Antenna tracking apparatus directs the primary antenna in response to a predetermined tracking pattern and in response to the difference signal for tracking the signal source with the primary antenna.

BRIEF DESCRIPTION OF THE DRAWINGS

For a more complete understanding of the present invention and the advantages thereof, reference is now made to the following Detailed Description taken in conjunction with the accompanying Drawings in which.

DETAILED DESCRIPTION

Figure 1:
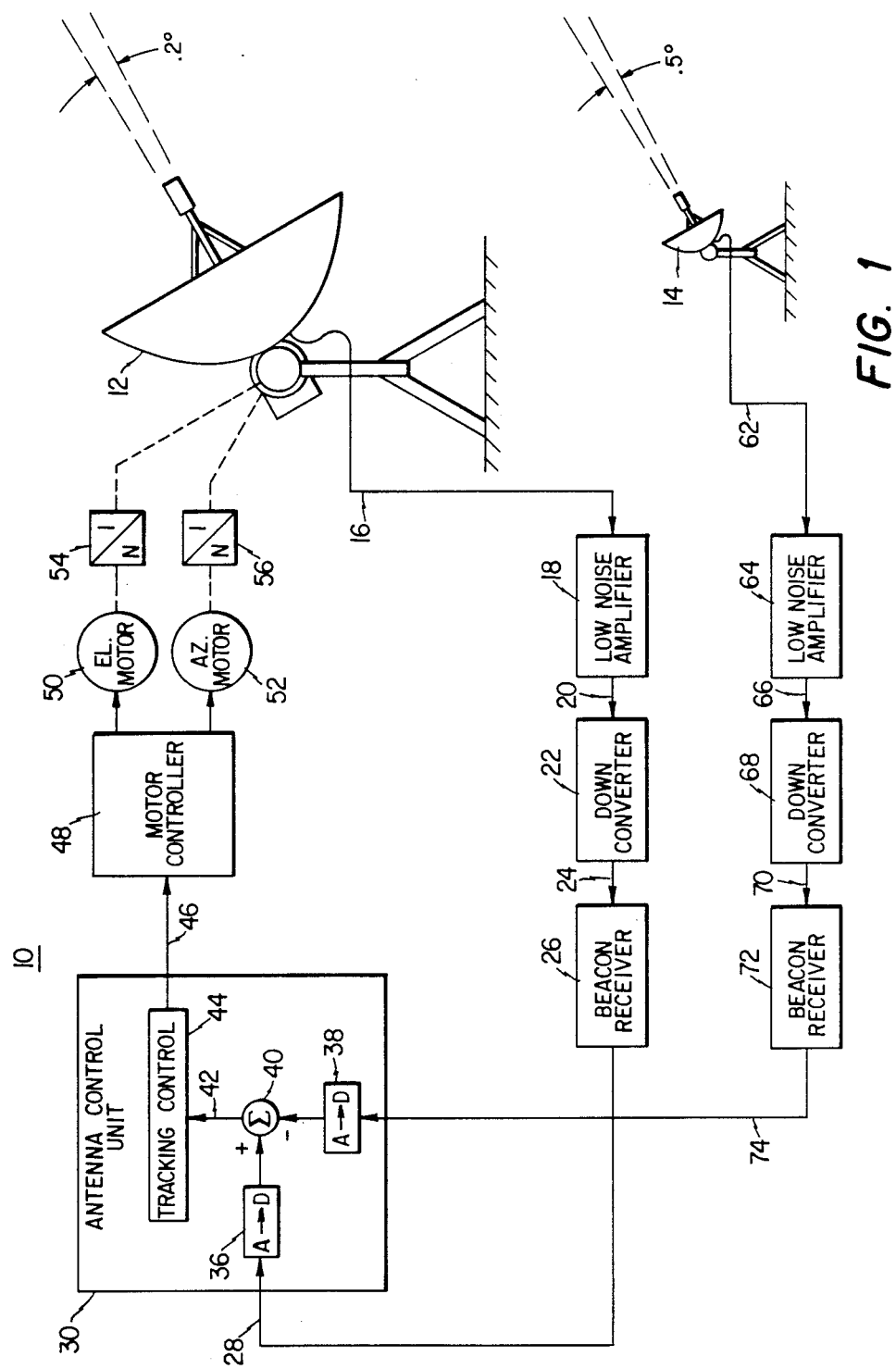
FIG. 1 is a schematic illustration of a tracking system in accordance with the present invention which includes both a primary and a secondary antenna.

Referring now to FIG. 1 there is illustrated an antenna tracking system 10 which includes a primary antenna 12 and a secondary antenna 14. The antenna 12 is, for example, a model 5351 manufactured by Vertex Communication Corp. and having a diameter of 9 meters. The antenna 12 can be selectively driven in both elevation and azimuth. The secondary antenna 14 is, for example, a model 5342 manufactured by Vertex Communication Corp. and having a diameter of 3.5 meters. At Ku band the antenna 12 has a beam width of approximately 0.2° and the antenna 14 has a beam width of approximately .5°.

The preferred application of the antenna 12 is to track and receive signals from a communication satellite in synchronous orbit. To maintain maximum signal strength and to determine the location of the satillite it is necessary to track the satellite. Such a communication satellite is a signal source which can move within a preassigned range location.

The antenna 12 receives a down link signal which is in the Ku frequency range of 12–14 GHz. This signal is transmitted through a line 16 to a low noise amplifier 18. The amplified signal is then transmitted through a line 20 to a down converter 22 which is, for example, a model 63R-5 mnufactured by Electrospace Systems, Inc. The output of the down converter 22 is a signal at 70 MHz which is transmitted through a line 24. The down converted signal transmitted through line 24 is provided to a step track beacon receiver 26 which is, for example, a model 43S-2 manufactured by Electrospace Systems, Inc. The output of the beacon receiver 26 is a voltage which is proportional to the signal strength. This signal strength signal is transmitted through a line 28 to an antenna control unit 30 which is, for example, a model 93C-15 manufactured by Electrospace Systems, Inc.

The antenna control unit 30 includes an analog-to-digital converter 36 which converts the signal strength signal at line 28 into a digital quantity. The unit 30 further includes a second analog-to-digital converter 38. The outputs of the converters 36 and 38 are input to a summation function 40 in which the output of converter 38 subtracted from the output of converter 36. The resulting difference signal is transmitted through a line 42 to a tracking control 44 within the antenna control unit 30. The antenna control unit 30 provides a step track function for directing the antenna 12 in accordance with a predetermined search pattern. The unit 30 further responds to the defference signal produced at line 42 for guiding the antenna 12 toward the maximum signal strength position.

The tracking signal produced by the antenna control unit 30 is transmitted through a line 46 to a motor controller which is, for example, a model 83MC-4 manufactured by Electrospace Systems, Inc. The controller 48 drives an elevation motor 50 and an azimuth motor 52. The motor 50 drives a gearbox 54 which in turn is mechanically linked to position the antenna 12 in elevation. The azimuth motor 52 drives a gearbox 56 which is mechanically linked to drive the antenna 12 in azimuth.

The antenna 14 is positioned on a fixed mount and directed at the same signal source as the antenna 12. The signal received by the antenna 14 is transmitted through a line 62 to a low noise amplifier 64. The output of the amplifier 64 is transmitted through a line 66 to a down converter 68 which is similar to the down converter 22. The output from the down converter 68 is transmitted through a line 70 to a beacon receiver 72 which is similar to the receiver 26. The down converted output from the receiver 72 is transmitted through a line 74 to the input of the analog-to-digital converter 38.

Figure 2A:
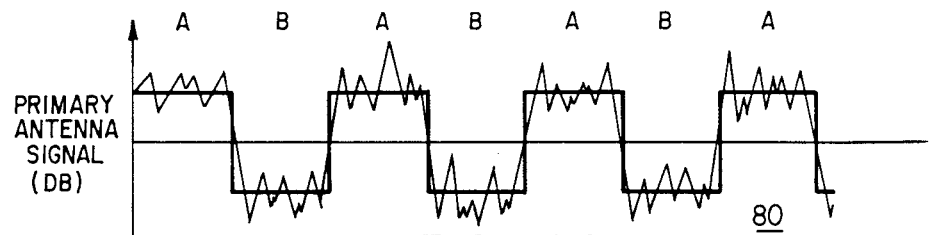
FIG. 2A, 2B and 2C are illustrations of various signals present in the system shown in FIG. 1.
Figure 2B:
Figure 2C:
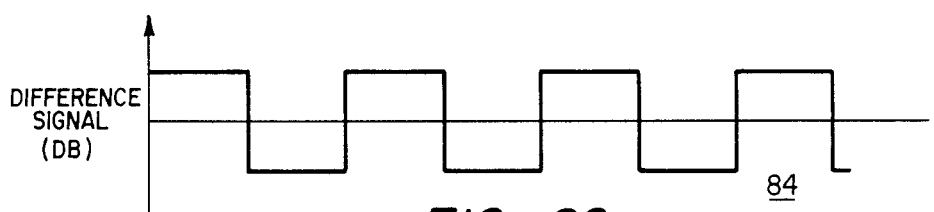

Referring now to FIG. 2A there is shown a primary antenna signal 80 which is transmitted through line 28 to the converter 36. In FIG. 2B there is shown a secondary antenna signal 82 which is transmitted through line 74 to the converter 38. A difference signal 84, shown in FIG. 2C, is produced at line 42 at the output of the summation function 40.

Figure 3:
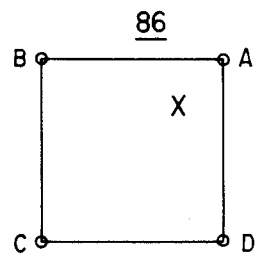
FIG. 3 illustrates a tracking pattern which is carried out by the primary antenna shown in FIG. 1.

A tracking pattern 86 of the antenna 12 as provided by the antenna control unit 30 is shown in FIG. 3. The position of the signal source is indicated by the letter X. The boresight of the antenna 12 is stepped between the positions indicated as A, B, C and D. The present invention operates similarly in azimuth and elevation so for purposes of simplification the description is limited to the azimuth tracking only. Referring back to signal 80 in FIG. 2A there is shown noise which overrides the basic signal level signal which is essentially a square wave. The basic square wave portion of the signal corresponds to respective greater and lesser amplitudes at the A and B positions since the signal source is closer at the A position. The noise or signal variation component of signal 80 is shown to be riding on the basic signal. In many applications the noise or signal variation component of the signal 80 can have a greater amplitude than the received signal variations due to scanning.

In FIG. 2B there is shown the signal 82 which is the signal received through the secondary antenna 14 and includes the same noise or signal variation component that is shown in FIG. 2A. Since the secondary antenna 14 is not being tracked in a search pattern, there is not the step feature of the received signal as shown in FIG. 2A.

The signals 80 and 82, after conversion to digital quantities are summed in the summation function 40 to produce a difference signal. The signal 82 is subtracted from the signal 80. The signal 82 is normalized so that the basic amplitude is the same as that for signal 80. Typically, the amplitude of the signal 82 will be less since the antenna 14 is smaller than the antenna 12. The normalization can be carried out digitally in the antenna control unit 30. The noise and signal variation components of the signals 80 and 82 are essentially the same. Therefore the substraction process removes these noise components and leaves only the difference signal component due to the tracking pattern of the antenna 12. FIG. 2C illustrates the ideal situation of totally eliminating the noise component. In practice, however, this is not possible, but reduction of 80% of the noise can be readily achieved. The resulting difference signal in FIG. 2C clearly shows the greater amplitude at position A rather than position B. This difference in amplitude is then utilized by the antenna control unit 30 to direct the positioning of the antenna 12.

Figure 4:
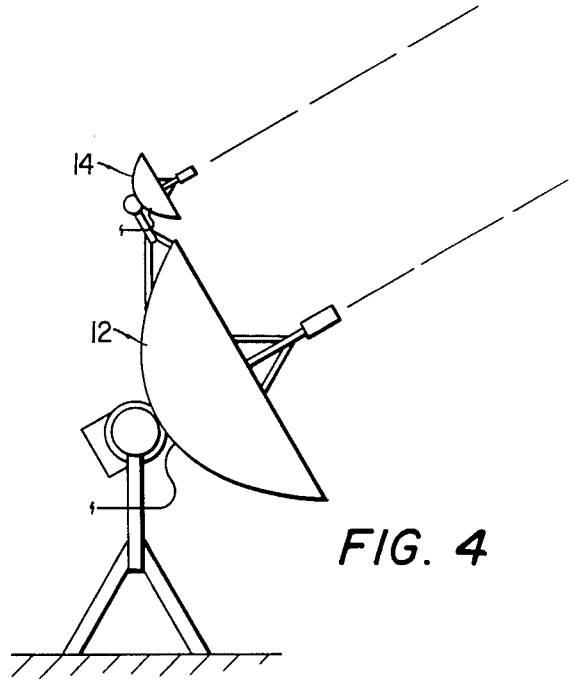
FIG. 4 is an alternative embodiment of the system shown in FIG. 1 wherein the secondary antenna is mounted on the primary antenna.

An alternative embodiment of the present invention is illlustrated in FIG. 4. In FIG. 1 the secondary antenna 14 is directed to the basic location of the selected satellite. The beam width of the antenna 14 is sufficiently large such that the target satellite does not move out of the main lobe of the antenna 14 beam. In certain applications it may be worthwhile to direct the primary antenna 12 to target satellites having high orbit inclinations. In this situation the secondary antenna 14 can be mounted permanently on the primary antenna 12 such that the bore sights of the two antennas are parallel. The signal produced by the antenna 14 will contain little or none of the step tracking variation present in the signal received by antenna 12 since the beam width of the antenna 14 is sufficiently wide such that the position of the target satellite is within the flat main lobe portion of the antenna pattern for the antenna 14.

In summary the present invention comprises a method and apparatus for tracking an antenna to follow a moving signal source despite the presence of substantial noise and signal variation on the tracking signal produced by the propagation path. A secondary antenna has a greater beam width than the primary antenna and is directed at the same satellite. The signals from the two antennas are combined in a difference function such that the noise is subtracted and substantially eliminated from the difference signal. The resulting difference signal corresponds closely to the step tracking of the primary antenna so that the maximum signal location can be determined for tracking the primary antenna to follow the signal source very accurately in position.

Although several embodiments of the invention have been illustrated in the accompanying Drawings and described in the foregoing Detailed Description, it will be understood that the invention is not limited to the embodiments disclosed, but is capable of numerous rearrangements, modifications and substitutions of parts and elements without departing from the scope of the invention.

I claim:

1. An antenna system for tracking a moving signal source, comprising:
   a primary tracking antenna having a narrow beam width for receiving a primary signal from said moving signal source, said primary signal including a tracking pattern component and a noise component resulting from atmospheric conditions and signal source variations;
   a secondary antenna having a beam width wider than said narrow beam width for receiving a secondary signal comprising said noise component but substantially none of said tracking pattern component;
   first means connected to said primary antenna for producing a first signal strength signal derived from said primary signal;

second means connected to said secondary antenna for producing a second signal strength signal derived from said secondary signal;

means for subtracting said second signal strength signal, which essentially comprises said noise component, from said first signal strength signal, which includes both said noise component and said tracking component, to produce a tracking signal which comprises said first signal strength signal having the noise component thereof substantially removed therefrom; and means for directing said primary tracking antenna in azimuth and elevation in response to a predetermined tracking pattern and to said tracking signal.

2. The antenna system of claim 1, wherein said narrow beam width of said primary antenna is approximately 0.2° and said beam width of said secondary antenna is approximately 0.5°.

3. The antenna system of claim 1, wherein said primary and secondary antennas are adapted to receive signals from said moving signal source in the frequency range of 12–14 GHz.

4. A method for tracking a moving signal source with a primary tracking antenna, comprising the steps of:

producing a first signal strength signal derived from a primary signal received from said primary antenna which tracks said source with a predetermined tracking pattern, said primary signal having a tracking pattern component due to said tracking pattern and a noise component resulting from atmospheric conditions and signal source variations;

producing a second signal strength signal derived from said noise component received from a secondary antenna directed generally toward said signal source, said second signal strength signal having substantially none of said tracking pattern component therein;

subtracting said second signal strength signal, which essentially comprises said noise component, from said first signal strength signal, which includes both said noise component and said tracking component, to produce a tracking signal which comprises said first signal strength signal having the noise component thereof substantially removed therefrom; and directing said primary tracking antenna in azimuth and elevation in response to said predetermined tracking pattern and to said tracking signal.

* * * * *